US008139680B2

(12) United States Patent         (10) Patent No.:     US 8,139,680 B2
Kleider et al.                    (45) Date of Patent:    Mar. 20, 2012

(54) SIGNAL ACQUISITION METHODS AND APPARATUS IN WIRELESS COMMUNICATION SYSTEMS

(75) Inventors: John Eric Kleider, Atlanta, GA (US); Steve Henry Arneson, Mesa, AZ (US); J. Scott Chuprun, Scottsdale, AZ (US); Keith Matthew Nolan, Chandler, AZ (US); Derrick Duane Hughes, Gilbert, AZ (US)

(73) Assignee: General Dynamics C4 Systems, Inc., Scottsdale, AZ (US)

( * ) Notice: Subject to any disclaimer, the term of this patent is extended or adjusted under 35 U.S.C. 154(b) by 1057 days.

(21) Appl. No.: 11/622,585

(22) Filed: Jan. 12, 2007

(65) Prior Publication Data

US 2008/0170644 A1    Jul. 17, 2008

(51) Int. Cl.
*H03K 9/00* (2006.01)
*H04L 27/00* (2006.01)

(52) U.S. Cl. .................................. 375/316; 375/242
(58) Field of Classification Search ............. 375/130, 375/142, 145, 343, 354, 316
See application file for complete search history.

(56) References Cited

U.S. PATENT DOCUMENTS

| | | |
|---|---|---|
| 4,067,009 A | 1/1978 | Constant |
| 5,051,991 A | 9/1991 | Szczutkowski |
| 5,276,703 A | 1/1994 | Budin et al. |
| 5,280,498 A | 1/1994 | Tymes |
| 5,296,935 A | 3/1994 | Bresler |
| 5,365,510 A | 11/1994 | Ellis et al. |
| 5,371,734 A | 12/1994 | Fischer |
| 5,479,441 A | 12/1995 | Tymes et al. |
| 5,526,357 A | 6/1996 | Jandrell |
| 5,528,621 A | 6/1996 | Heiman et al. |
| 5,555,257 A | 9/1996 | Dent |
| 5,594,941 A | 1/1997 | Dent |
| 5,610,940 A | 3/1997 | Durrant et al. |
| 5,615,282 A | 3/1997 | Spiegel et al. |
| 5,619,503 A | 4/1997 | Dent |
| 5,627,856 A | 5/1997 | Durrant et al. |
| 5,629,956 A | 5/1997 | Durrant et al. |
| 5,631,898 A | 5/1997 | Dent |
| 5,648,982 A | 7/1997 | Durrant et al. |
| 5,659,574 A | 8/1997 | Durrant et al. |
| 5,680,414 A | 10/1997 | Durrant et al. |
| 5,688,803 A | 11/1997 | Buttelmann et al. |
| 5,692,007 A | 11/1997 | Durrant et al. |

(Continued)

OTHER PUBLICATIONS

Kleider, John E. et al., "Preamble and Embedded Synchronization for RF Carrier Frequency-Hopped OFDM," IEEE Journal on Selected Areas in Communications, vol. 23, No. 5, May 2005, pp. 920-931.

(Continued)

*Primary Examiner* — David C. Payne
*Assistant Examiner* — Erin File
(74) *Attorney, Agent, or Firm* — Ingrassia Fisher & Lorenz, P.C.

(57) ABSTRACT

In an embodiment, a receiver includes an antenna configured to receive a communication frame. The communication frame may include an acquisition code symbol sequence, which in turn may include a plurality of acquisition code symbols. In an embodiment, an acquisition code symbol includes a subcode sequence having a plurality of subcodes. A receiver also may include a correlation calculator coupled to the antenna. The correlation calculator may be configured to determine a correlation between the subcodes of the received communication frame and a stored version of the subcodes. The correlation may be used in determining a timing offset for further processing of the communication frame.

17 Claims, 7 Drawing Sheets

U.S. PATENT DOCUMENTS

| | | | |
|---|---|---|---|
| 5,748,891 A | 5/1998 | Fleming et al. | |
| 5,754,584 A | 5/1998 | Durrant et al. | |
| 5,754,585 A | 5/1998 | Durrant et al. | |
| 5,757,847 A | 5/1998 | Durrant et al. | |
| 5,812,947 A | 9/1998 | Dent | |
| 5,832,028 A | 11/1998 | Durrant et al. | |
| 5,848,060 A | 12/1998 | Dent | |
| 5,856,998 A | 1/1999 | Durrant et al. | |
| 5,870,588 A | 2/1999 | Rompaey et al. | |
| 5,872,810 A | 2/1999 | Philips et al. | |
| 5,881,100 A | 3/1999 | Durrant et al. | |
| 5,920,278 A | 7/1999 | Tyler et al. | |
| 5,960,028 A * | 9/1999 | Okamoto et al. | 375/130 |
| 5,963,586 A | 10/1999 | Durrant et al. | |
| 5,991,308 A | 11/1999 | Fuhrmann et al. | |
| 5,999,561 A | 12/1999 | Naden et al. | |
| 6,002,708 A | 12/1999 | Fleming | |
| 6,118,603 A | 9/2000 | Wilson et al. | |
| 6,154,486 A * | 11/2000 | Scott et al. | 375/142 |
| 6,157,649 A | 12/2000 | Peirce et al. | |
| 6,157,811 A | 12/2000 | Dent | |
| 6,181,714 B1 | 1/2001 | Isaksson et al. | |
| 6,212,222 B1 * | 4/2001 | Okubo et al. | 375/149 |
| 6,307,868 B1 | 10/2001 | Rakib et al. | |
| 6,307,877 B1 | 10/2001 | Philips et al. | |
| 6,320,903 B1 | 11/2001 | Isaksson et al. | |
| 6,353,406 B1 | 3/2002 | Lanzl et al. | |
| 6,356,555 B1 | 3/2002 | Rakib et al. | |
| 6,356,607 B1 * | 3/2002 | Scott et al. | 375/354 |
| 6,359,926 B1 | 3/2002 | Isaksson et al. | |
| 6,363,107 B1 * | 3/2002 | Scott | 375/150 |
| 6,363,128 B1 | 3/2002 | Isaksson et al. | |
| 6,366,554 B1 | 4/2002 | Isaksson et al. | |
| 6,377,683 B1 | 4/2002 | Dobson et al. | |
| 6,385,259 B1 * | 5/2002 | Sung et al. | 375/343 |
| 6,385,268 B1 | 5/2002 | Fleming | |
| 6,396,046 B1 | 5/2002 | Possin et al. | |
| 6,400,753 B1 | 6/2002 | Kohli et al. | |
| 6,400,754 B2 | 6/2002 | Fleming et al. | |
| 6,438,174 B1 | 8/2002 | Isaksson et al. | |
| 6,456,649 B1 | 9/2002 | Isaksson et al. | |
| 6,466,629 B1 | 10/2002 | Isaksson et al. | |
| 6,483,828 B1 | 11/2002 | Balachandran et al. | |
| 6,484,124 B1 | 11/2002 | MacMullen | |
| 6,493,395 B1 | 12/2002 | Isaksson et al. | |
| 6,538,986 B2 | 3/2003 | Isaksson et al. | |
| 6,549,770 B1 | 4/2003 | Marran | |
| 6,571,285 B1 | 5/2003 | Groath et al. | |
| 6,597,727 B2 | 7/2003 | Philips et al. | |
| 6,606,588 B1 | 8/2003 | Schaumont et al. | |
| 6,611,755 B1 | 8/2003 | Coffee et al. | |
| 6,633,814 B2 | 10/2003 | Kohli et al. | |
| 6,639,939 B1 | 10/2003 | Naden et al. | |
| 6,643,678 B2 | 11/2003 | Van Wechel et al. | |
| 6,650,649 B1 | 11/2003 | Muhammad et al. | |
| 6,654,432 B1 | 11/2003 | O'Shea et al. | |
| 6,665,308 B1 | 12/2003 | Rakib et al. | |
| 6,671,311 B1 | 12/2003 | Raphaeli et al. | |
| 6,687,315 B2 | 2/2004 | Keevill et al. | |
| 6,687,507 B2 | 2/2004 | Fischer et al. | |
| 6,697,345 B1 | 2/2004 | Corrigan, III et al. | |
| 6,700,538 B1 | 3/2004 | Richards | |
| 6,724,811 B2 | 4/2004 | Kohli et al. | |
| 6,731,673 B1 * | 5/2004 | Kotov et al. | 375/145 |
| 6,735,630 B1 | 5/2004 | Gelvin et al. | |
| 6,748,015 B2 | 6/2004 | Kohli et al. | |
| 6,762,712 B2 | 7/2004 | Kim | |
| 6,785,513 B1 | 8/2004 | Sivaprakasam | |
| 6,795,491 B2 | 9/2004 | Fleming | |
| 6,812,824 B1 | 11/2004 | Goldinger et al. | |
| 6,826,607 B1 | 11/2004 | Gelvin et al. | |
| 6,832,251 B1 | 12/2004 | Gelvin et al. | |
| 6,836,515 B1 | 12/2004 | Kay et al. | |
| 6,839,389 B2 | 1/2005 | Mehrnia et al. | |
| 6,850,252 B1 | 2/2005 | Hoffberg | |
| 6,859,831 B1 | 2/2005 | Gelvin et al. | |
| 6,865,232 B1 | 3/2005 | Isaksson et al. | |
| 6,877,043 B2 | 4/2005 | Mallory et al. | |
| 6,882,634 B2 | 4/2005 | Bagchi et al. | |
| 6,888,844 B2 | 5/2005 | Mallory et al. | |
| 6,891,881 B2 | 5/2005 | Trachewsky et al. | |
| 6,892,131 B2 | 5/2005 | Coffee et al. | |
| 2001/0014086 A1 * | 8/2001 | Jeong et al. | 370/335 |
| 2002/0161737 A1 | 10/2002 | Chi et al. | |
| 2003/0118086 A1 * | 6/2003 | Pietila et al. | 375/150 |
| 2005/0220051 A1 | 10/2005 | Lavean | |
| 2008/0037614 A1 | 2/2008 | Douglas | |

OTHER PUBLICATIONS

Kleider, John E. et al., "Synchronization for Broadband OFDM Mobile AD HOC Networking: Simulation and Implementation," IEEE, 2002, pp. 3756-3759.

Tufvesson, Frank, "Time and Frequency Synchronization for OFDM using PN-Sequence Preambles," IEEE, 1999, pp. 2203-2207.

Schmidl, Timothy M., "Robust Frequency and Timing Synchronization for OFDM," IEEE Transactions on Communications, vol. 45, No. 12, Dec. 1997, pp. 1613-1621.

* cited by examiner

SIGNAL ACQUISITION METHODS AND APPARATUS IN WIRELESS COMMUNICATION SYSTEMS

CROSS-REFERENCE TO RELATED APPLICATION

This application is related to U.S. patent application Ser. No. 11/622,587, filed concurrently herewith, and entitled "Methods And Apparatus For Acquiring Signals Using Coherent Match Filtering."

TECHNICAL FIELD

Embodiments of the inventive subject matter relate to the field of wireless communications and, more specifically, to signal acquisition methods and apparatus in wireless communication systems.

BACKGROUND

In typical wireless communication systems, mobile units first synchronize with a base station before data transfer may occur. A base station transmits a communication frame that includes a synchronization subframe and a data subframe. The synchronization subframe may include an acquisition sequence that includes a number of code signals which are compared to a reference signal at the mobile unit. The reference signal may be a locally generated or a stored version of the acquisition sequence. A comparison signal may be generated by comparing the received acquisition sequence and the reference signal that includes an overall correlation peak, which may then be used to determine the timing for receipt of the data portion of the communication frame.

The comparison of the received acquisition sequence and the reference signal may be determined by computing the correlation of the received acquisition sequence and the reference signal. The correlation of the two signals produces a third function that expresses the overlap of the two functions. When the received acquisition sequence and the reference signal overlap completely, the result of the correlation reaches a maximum value. For certain types of sequences, the maximum value may be a peak M times higher than any other value from an incomplete match. This peak value may be used to determine the timing offset of the communication frame between the transmitter and receiver.

To simplify calculations, the correlation of the received acquisition sequence and the reference signal may be calculated in the frequency domain instead of the time domain. Frequency domain processing has been demonstrated to provide significant savings compared to equivalent time domain processing. Convolution in the time domain is equivalent to multiplication in the frequency domain. The received acquisition sequence and the reference signal in the time domain may be converted to the frequency domain by computing a Fourier transform of the received acquisition sequence and the reverse conjugate of the reference signal. An inverse Fourier transform of the product of the Fourier transforms of the received signal and the reverse conjugate of the reference signal may then be determined to convert back to the time domain. The result may be used to determine the correlation peak in time. A Fourier transform may be calculated using a fast Fourier transform (FFT) algorithm.

One drawback of this approach is that significant hardware resources are used to compute the FFT as the acquisition sequence increases in size. Also, an amount of memory used to determine the FFT increases as the size of the acquisition sequence increases.

Accordingly, it is desired to provide low complexity, high processing gain signal acquisition methods and systems. Furthermore, desirable features and characteristics of embodiments of the inventive subject matter are apparent from the subsequent detailed description and the appended claims, taken in conjunction with the accompanying drawings and the foregoing technical field and background.

BRIEF DESCRIPTION OF THE DRAWINGS

Embodiments of the inventive subject matter are hereinafter described in conjunction with the following drawing figures, wherein like numerals denote like elements, and.

DETAILED DESCRIPTION

The following detailed description of embodiments of the inventive subject matter is merely exemplary in nature and is not intended to limit the inventive subject matter or the application and uses of the inventive subject matter. Furthermore, there is no intention to be bound by any theory presented in the preceding background or the following detailed description.

Figure 1:
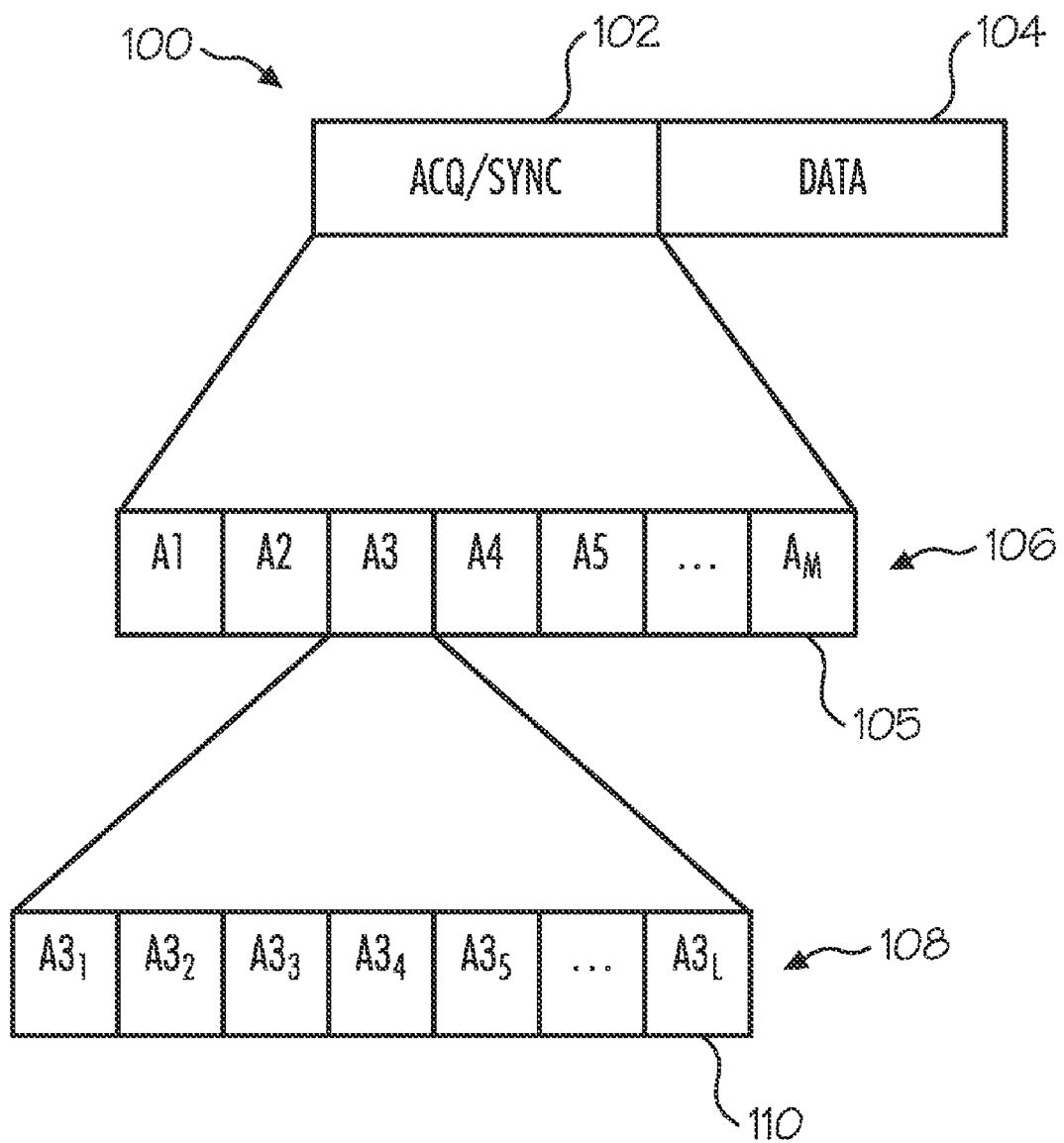
FIG. 1 illustrates a block diagram of a simplified communication frame in accordance with an example embodiment of the inventive subject matter.

FIG. 1 illustrates a block diagram of a simplified communication frame 100 in accordance with an example embodiment of the inventive subject matter. Communication frame 100 includes an acquisition/synchronization (ACQ/SYNC) subframe 102 (referred to herein as "acquisition subframe") and a data subframe 104, in an embodiment. Communication frame 100, as illustrated in FIG. 1 is highly simplified. Communication frame 100 may include additional subframes and other elements in other embodiments.

Acquisition subframe 102 includes at least one acquisition code symbol sequence 106, in an embodiment. In an embodiment, acquisition code symbol sequence 106 includes a plurality of acquisition code symbols 105. For example, M acquisition code symbols 105, A1 through AM, may form an acquisition code symbol sequence 106. Using prior techniques, as the number of acquisition code symbols increases (e.g., M increases), the processing times and resources for FFT calculations also may increase. Additionally, the amount of memory used to perform FFT calculations also may increase. When the amount of memory used to perform an FFT calculation exceeds the internal memory of the processor used to perform the FFT calculation, additional external memory may be used. This use of external memory may significantly slow the processor.

In an embodiment, each acquisition code symbol 105 may have a length of N1 samples, and each of the acquisition code symbols 105 may be divided into a subcode sequence 108. Each subcode sequence 108 may be formed from a plurality of L subcodes 110 of length N2, such that N1=N2×L. Thus, for a given acquisition code symbol 105, such as A3, there are L subcodes 110, which, in an embodiment, may be represented by the symbols $A3_1$ to $A3_L$, as illustrated in FIG. 1. In an embodiment, subcodes 110 may be selected such that the subcode sequence 108 and each of the acquisition code symbols 105 of the acquisition code symbols sequence 106 contain substantially the same transmissive energy. Any one of a number of codes (e.g., Barker codes or Walsh codes) may be used for a subcode sequence and an acquisition code symbol sequence, in various embodiments. In an embodiment, pseudo-random code sequences (e.g., PN codes) may be used for the subcode sequence and the acquisition code symbol sequence.

By reducing a single, large acquisition code symbol sequence 106 into multiple, small subcodes 110, in accordance with various embodiments, processing advantages may be obtained. For example, in an embodiment, an acquisition code symbol 105, such as A3, that includes 8,192 code samples, may be divided into thirty-two subcodes 110 (e.g., L=32). Each of the thirty-two subcodes 110, which may be represented as, in an embodiment, $A3_1$, through $A3_{32}$, may include 256 code samples, in an example embodiment. Using prior techniques, a total of 8,192 log (8,192) operations (approximately 32,058 operations) may be used to compute an FFT on A3. Using embodiments of the inventive subject matter, a total of 32(256 log (256)) operations (approximately 19,728 operations) may be used to compute an FFT on the thirty two subcodes $A3_1$ through $A3_{32}$. Thus, the use of smaller subcodes 110 as part of a subcode sequence 108 may reduce a number of operations to perform a correlation calculation. Additionally, when there are fewer operations to calculate, a smaller amount of internal processor memory may be used when computing the FFT of the subcodes 110, in an embodiment, as compared to computing the FFT of each acquisition code symbol.

In an embodiment, substantially the same (e.g., identical) codes may be used for each subcode 110 in a subcode sequence 108. By selecting substantially the same codes for each subcode 110 in a subcode sequence 108, various processing advantages may be achieved, as is described in more detail below.

Figure 2:
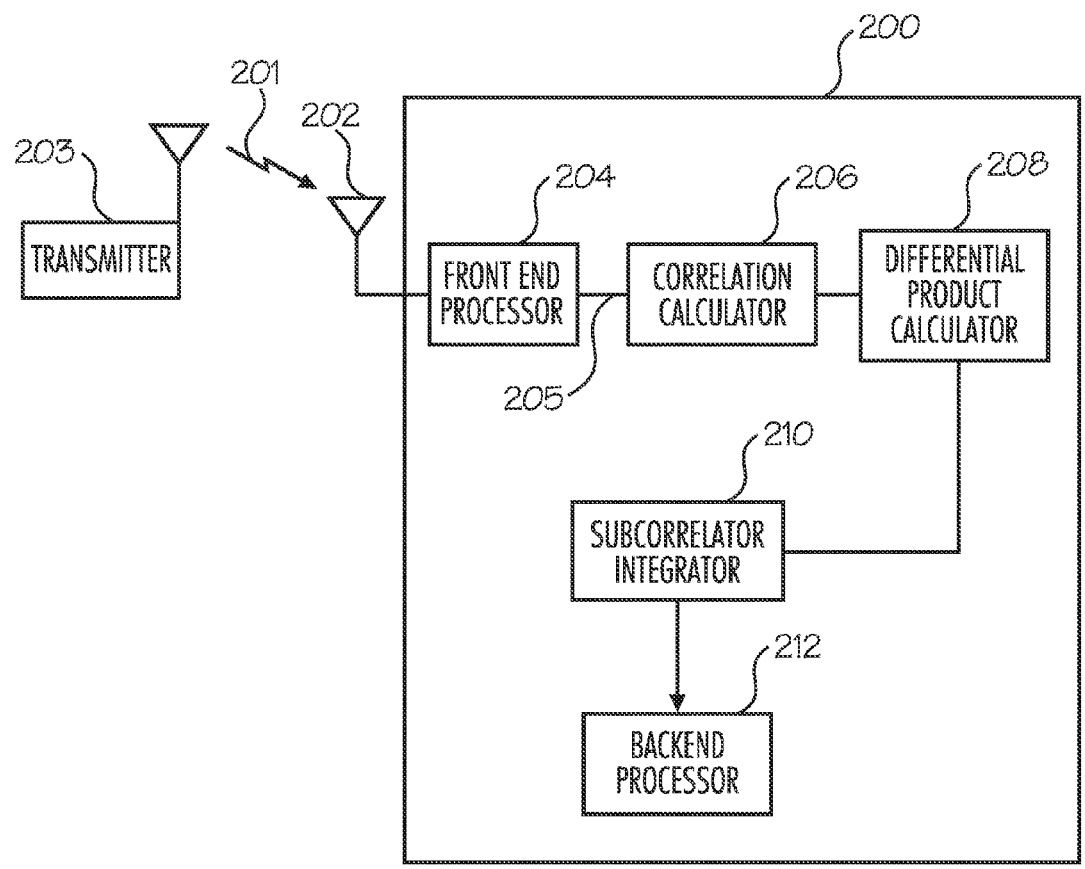
FIG. 2 illustrates a block diagram of a communication system in accordance with an example embodiment.

FIG. 2 illustrates a block diagram of a communication system in accordance with an example embodiment. A communication system includes a receiver 200 and a transmitter 203. Receiver 200 receives signals 201 from transmitter 203. Signals 201 may include communication frames (e.g., communication frame 100, FIG. 1). A communication frame 100 may include subcode sequence 108 as described previously. Receiver 200 includes an antenna 202, a front end processor 204, and a correlation calculator 206, in an embodiment. In addition, receiver 200 may include a differential product calculator 208, a subcorrelator integrator 210 and a backend processor 212, in an embodiment.

Upon receipt of a communication frame (e.g., communication frame 100, FIG. 1) via antenna 202, front end processor 204 may provide signal processing. Front end processor 204 may include, for example, a processor, an analog-to-digital (A/D) converter, and a numerically controlled oscillator (NCO), in an embodiment. Processing may include, for example, analog-to-digital (A/D) conversion, and amplification and/or filtering of an acquisition code symbol sequence (e.g., sequence 106, FIG. 1). In addition, in an embodiment, an NCO, as part of a phase locked loop (PLL), may be used to adjust the frequency and phase of the received acquisition code symbol sequence to match the frequency and phase of the transmitter 203. In an embodiment, the NCO may receive frequency offset data from the received signal and adjust the frequency of receiver 200. Front end processor 204 may produce a processed signal 205.

In an embodiment, correlation calculator 206 determines a correlation between the processed signal 205 and a reference signal stored at the receiver 200, and produces a plurality of correlation peaks. The reference signal stored at receiver 200 may include a copy of an acquisition code symbol sequence (e.g., sequence 106, FIG. 1). In an embodiment, the reference signal may be a time-domain reference signal. A correlation between the processed signal 205 and the stored reference signal may be determined using various time domain and/or frequency domain correlation methods, in various embodiments. Calculating shift correlations or convolutions in the time domain may be more complex than calculating correlations in the frequency domain, as discussed previously. Correlation calculation may be done in the frequency domain by multiplying a fast Fourier transform (FFT) of the processed signal 205 and an FFT of the stored reference signal. In an embodiment, an FFT of the stored reference signal includes a zero-padded time-reversed conjugate of the time-domain stored reference signal. In an embodiment, an inverse FFT (IFFT) of the resultant product is calculated to produce a time domain correlation. As discussed previously, a correlation of each subcode (e.g., subcode 110, FIG. 1) may have its own correlation peak, and an overall correlation peak may be present for a subcode sequence (e.g., sequence 108, FIG. 1). Correlation calculator 206 produces a correlation peak for each subcode.

Figure 3:
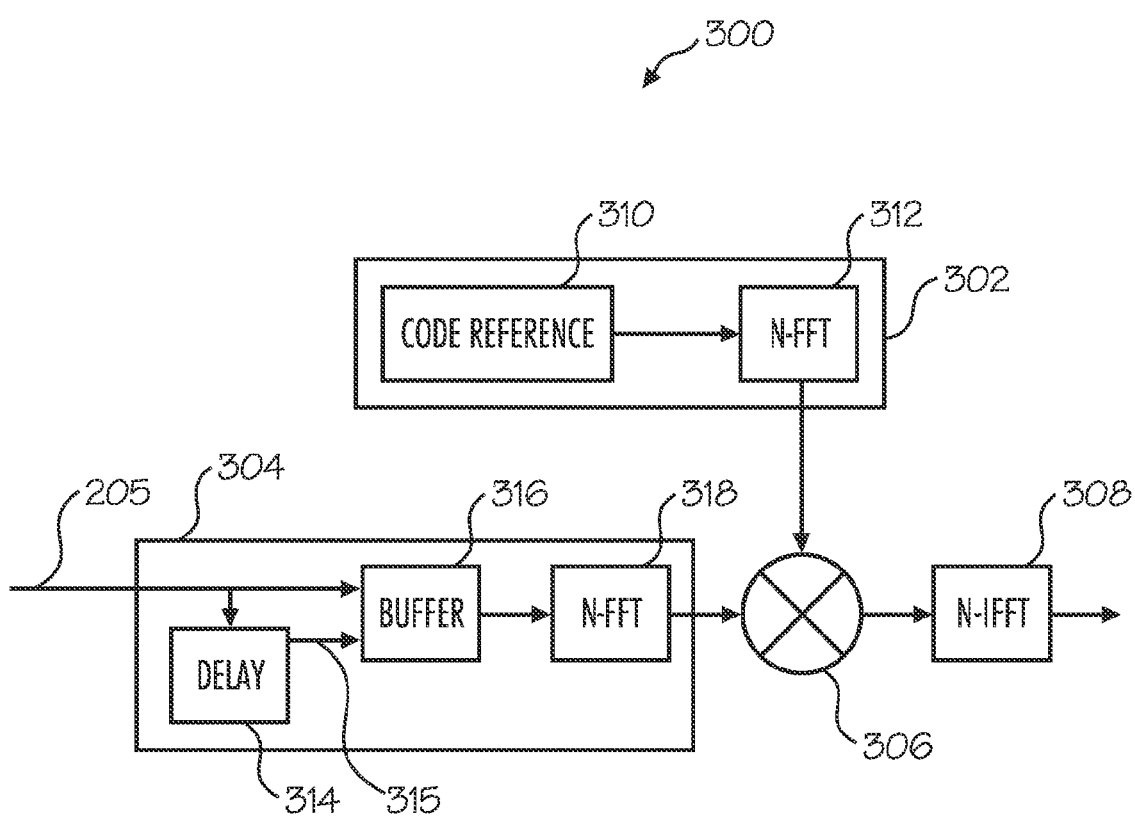
FIG. 3 illustrates an embodiment of a correlation calculator in accordance with an example embodiment.

FIG. 3 illustrates an embodiment of a correlation calculator 300 (e.g., correlation calculator 206, FIG. 2) in accordance with an example embodiment. In an embodiment, correlation calculator 300 includes a matched filter correlator, which in turn includes a reference FFT calculator 302, a received acquisition sequence FFT calculator 304, a multiplier 306, and an IFFT calculator 308.

Reference FFT calculator 302 is configured to convert a stored version of a plurality of subcodes into a first frequency domain reference signal. In an embodiment, reference FFT calculator 302 includes a code reference 310 and a first N-length FFT calculator 312, in an embodiment. Code reference 310 may include a stored version of a subcode sequence (e.g., subcode sequence 108, FIG. 1), which may include a stored version of a plurality of subcodes (e.g., subcodes 110, FIG. 1). Each subcode may include a fixed length code. In an embodiment, each subcode includes a fixed length pseudo-random (PN) code of length N/2. Pseudo-random codes may include binary sequences that exhibit random noise-like properties. In an embodiment, the PN code for each subcode may be the same. In an example embodiment, a subcode sequence 108 may include eight subcodes 110 (L=8), although a sequence may include more or fewer subcodes. When each PN code is of N/2 length, to form an N length sequence for processing in the N-length reference FFT calculator 312, 0's may be added to the sequence (e.g., using zero padding techniques). In an embodiment, multiplier 306 multiplies an FFT of code reference 310 using a vector transpose of a reverse conjugate of the PN code and a reverse conjugate with zero padding. Thus, if r(n)=PN then $r^2(n)^* = [NP^*-\text{zero padding}]^T$, and the first N-length reference FFT calculator 312 may compute the FFT of $r^2(n)^*$.

Correlation in the time domain is equivalent to time-reversed, conjugate multiplication in the frequency domain, followed by an inverse FFT. In some cases, it may be easier to calculate an FFT and perform multiplication in the frequency domain, followed by an inverse FFT to convert back to the time domain, than it is to compute a correlation integral in the time domain. However, multiplication in the frequency domain, followed by the inverse FFT, may include a cyclic correlation process, where correlation in the time domain is a linear correlation. In cyclic correlations, the response at the end of a sequence wraps around to the beginning and the overlapping samples sum linearly. Cyclic correlation is also known as time aliasing.

To alleviate time aliasing, a method of determining the FFT of a received acquisition sequence may be used. In an embodiment, an overlap and save process may be used to determine the FFT of a received acquisition sequence. An overlap and save process may use a succession of windows of received acquisition sequences as input for an FFT operation. Therefore, using an overlap and save process, a received acquisition sequence may be divided into overlapping sections. In an alternate embodiment, an overlap and add process may be used to determine the FFT of a received acquisition sequence.

Received acquisition sequence FFT calculator 304 may be configured to convert the plurality of subcodes into a second frequency domain reference signal. In an embodiment, to implement an overlap and save process, received acquisition sequence FFT calculator 304 receives a signal (e.g., processed signal 205, FIG. 2), combines that signal with a one-subcode delayed version of the acquisition code symbol sequence 315 from delay 314, and stores the result to a buffer 316. Buffer 316 may store the acquisition code symbol sequence with the one-subcode delayed version of the acquisition code symbol sequence 315. In an embodiment, buffer 316 may be divided into a plurality of rows and a plurality of columns (e.g., $c_1 \ldots c_8$). A row of buffer 316 may include the acquisition code symbol sequence, and another row may include the delayed version of the acquisition code symbol sequence. Further, an entry in a column may include a subcode of the acquisition sequence and another entry in the column may include a delayed version of the subcode. An example of a stored result is shown in Table 1, below.

TABLE 1

| Buffer = | | | | | | | | |
|---|---|---|---|---|---|---|---|---|
| | Columns | | | | | | | |
| | $c_1$ | $c_2$ | $c_3$ | $c_4$ | $c_5$ | $c_6$ | $c_7$ | $c_8$ |
| Delayed Data | A | B | C | D | E | F | G | H |
| Non-delayed | B | C | D | E | F | G | H | I |

The first row of Table 1 includes an identification of columns in the buffer 316. The second row includes the subcodes (e.g., subcodes 110, FIG. 1) of the one-subcode delayed version of the acquisition code symbol sequence 315, and the third row includes the received subcodes (e.g., subcodes 110, FIG. 1) of the processed signal 205 (e.g., the acquisition code symbol sequence 205). As new buffer data is received, the data within buffer 316 may be shifted to the right, and the oldest data may be discarded. The new data may be shifted into the first column. In an embodiment, where there are eight subcodes (L=8), buffer 316 may be an eight column by two row matrix. Initially, columns $c_1$ through $c_8$ are used. As new data is received, old data may be shifted to the right, and the new data may be stored in column $c_1$. The iterations continue until all of the data is processed.

Therefore, in an embodiment where there are eight subcodes (L=8), buffer 316 may supply a received acquisition sequence to a second N-length FFT calculator 318. For example, the sequence may be supplied as represented in Equation (Eqn.) 1.

$$x(n)=[AB]^T[BC]^T[CD]^T[DE]^T[EF]^T[FG]^T[GH]^T[HI]^T \quad \text{Eqn. 1}$$

where superscript $[.]^T$ denotes a matrix transpose operation on matrix $[.]$.

The output of the first N-length FFT calculator 312 and the output of the second N-length acquisition FFT calculator 318 may be multiplied at multiplier 306. The multiplier output may be input into IFFT calculator 308, which may determine a time domain correlation of the multiplier output.

As discussed previously, in an embodiment, the PN code for each subcode 110, such as subcode A through H, may be the same. In this embodiment, the time domain correlation may be calculated in a low complexity manner. As noted before, for an acquisition code including eight subcodes 110 in a subcode sequence 108. For example, the received acquisition code may be represented as shown in Eqn. 2.

$$x(n)=[AB]^T[BC]^T[CD]^T[DE]^T[EF]^T[FG]^T[GH]^T[HI]^T \quad \text{Eqn. 2}$$

A buffer, in this example embodiment, may again be represented as shown in Table 2.

TABLE 2

| Buffer = | | | | | | | | |
|---|---|---|---|---|---|---|---|---|
| | Columns | | | | | | | |
| | $c_1$ | $c_2$ | $c_3$ | $c_4$ | $c_5$ | $c_6$ | $c_7$ | $c_8$ |
| Delayed Data | A | B | C | D | E | F | G | H |
| Non-delayed | B | C | D | E | F | G | H | I | or, equivalently, Buffer=$\{c_i\ c_{i+1}\ c_{i+2}\ c_{i+3}\ c_{i+4}\ c_{i+5}\ c_{i+6}\ c_{i+7}\}$ When r(n) includes the PN code for each of the subcode sequences, and $r^2(n)^*$ includes the input to the first N-length reference calculator 312, then R(w) includes an output of first N-length FFT calculator 312. R(w) may be calculated as R(w)=FFT $[r^2(n)^*]$, where $R^8(w)=[R^1(w)\ R^2(w)\ R^3(w) \ldots R^8(w)]$. When each subcode is substantially the same (e.g., identical), then $R^8(w)=[R(w)\ R(w)\ R(w)\ R(w)\ R(w)\ R(w)\ R(w)\ R(w)]$ for L=8.

An output of the received acquisition sequence FFT calculator 304 may be expressed as Buffer_FD=FFT[Buffer]. For i=1, representing the first time through the calculations, Buffer=$[c_1\ c_2\ c_3\ \ldots\ c_8]$. For each subsequent iteration, Buffer=$[c_{i+1},\ c_{i+2},\ c_{i+3},\ c_{i+4},\ c_{i+5},\ c_{i+6},\ c_{i+7}]$. For example, when i=2, Buffer=$[c_2\ c_3\ c_4\ \ldots\ c_9]$, and when i=3, Buffer=$[c_3\ c_4\ c_5\ \ldots\ c_{10}]$.

From the above, an efficient method for calculating the inverse FFT may be achieved. First, for step i=1, $y_1$=IFFT[Buffer_FD×$R^8(w)$] may be computed. Next, for step i=2, $y_2=[y_1(:,2:8)$IFFT[FFT[$c_9$]×R(w)]], where $y_1(:,2:8)$=IFFT[Buffer_FD(:,2:8)_×$R^7(w)$] from $y_1$ is stored and re-used. Therefore, for any $i^{th}$ step, $y_i=[y_{i-1}(:,2:8)$IFFT[FFT[$c_{i+7}$]×R(w)] where $y_{i-1}(:,2:8)$=IFFT[Buffer FD(:,2:8)×$R^7(w)$] from the previous step. Thus, for each $i^{th}$ step, the IFFT[FFT[$c_{i+7}$]×R(w)] is calculated.

The plurality of correlation peaks output from the correlation calculator 206 is processed by differential product calculator 208, in an embodiment. Differential product calculator 208 may compensate for a frequency and/or phase offset. Specifically, differential product calculator 208 may remove time varying phase offsets that may occur between each correlation peak. Considering the case where L=2, the output of the correlation calculator may be represented as $y=[y_1\ y_2]$, where $y_1=a_1*\exp(j2\pi(\phi_1+\theta))$ and $y_2=a_2*\exp(j2\pi(\phi_2+\theta))$. $\phi_1$ and $\phi_2$ occur due to the relative Doppler and/or oscillator frequency shift between the transmitter and receiver. $\phi_1$ results from frequency shift of the correlation output $y_1$ at time $t_1$, while $\phi_2$ results from the frequency shift at time $t_2$. $\theta$ is representative of the carrier phase shift between the transmitter and receiver oscillators. The differential product of $y_1$ and $y_2$ is then $y_d=y_2*\mathrm{conj}(y_1)=a_1a_2\exp(j2\pi(\phi_2-\phi_1))$, which is free of carrier phase shift. Frequency offset $\delta_f$ can be described as a rotating phase vector, $\Delta\phi$, over time, $\Delta T_{baud}$, represented as $\delta_f=\Delta\phi/\Delta T_{baud}=(\phi_2-\phi_1)/(t_1-t_2)$. The phase of the term $\exp(j2\pi(\phi_2-\phi_1))$ is thus representative of the frequency offset. When the angle of this term is small, which often may be the case in practice, the magnitude of $a_1a_2$ may be substantially equivalent to the magnitude of $a_1a_2\exp(j2\pi(\phi_2-\phi_1))$, and $y_d$ is free of phase and frequency offset.

Figure 4:
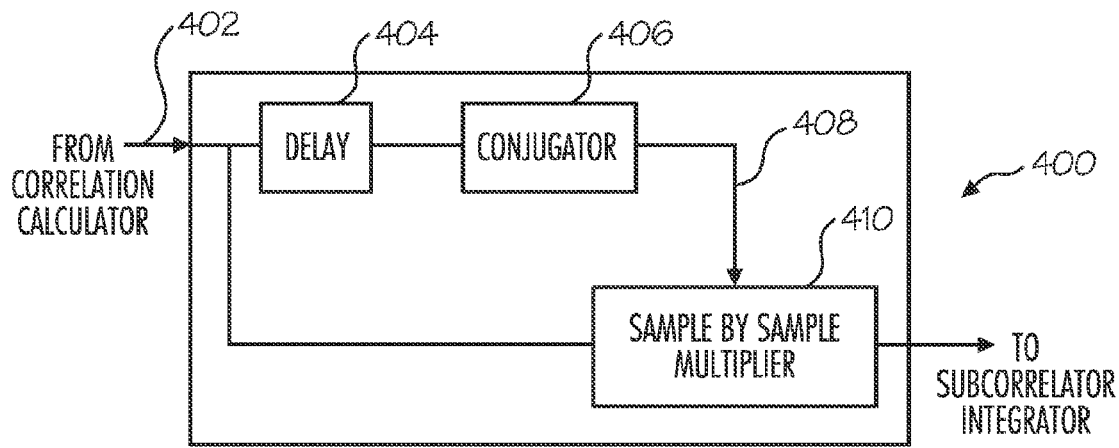
FIG. 4 illustrates a block diagram of a differential product calculator in accordance with an example embodiment.

FIG. 4 illustrates a block diagram of a differential product calculator 400 (e.g., differential product calculator 208, FIG. 2) in accordance with an example embodiment. In an embodiment, differential product calculator 400 includes a delay 404, a conjugator 406, and a sample-by-sample multiplier 410, in an embodiment. Differential product calculator 400 receives a correlation calculator output 402 (e.g., correlation calculator 206, FIG. 2), which includes a plurality of correlation peaks. Delay 404 delays the correlation calculator output 402, and conjugator 406 produces a conjugate of the delayed output, to produce a delayed, conjugated version 408 of the correlation calculator output 402. Symbol-by-symbol multiplier 410 produces a result that may be substantially free from any frequency or phase rotation offset. The output may be provided to a subcorrelator integrator (e.g., subcorrelator integrator 210, FIG. 2).

Referring back to FIG. 2, given that a frequency offset may be present prior to the differential product calculator 208, the use of subcodes (e.g., subcodes 110, FIG. 1) may ensure that the correlation length is shorter than it may be without the use of a subcode structure, assuming that equivalent processing gain is present in a non-subcode based correlator system. Using shorter length correlations with the differential product calculator 208 may allow output peaks of the differential product to be larger (e.g., larger correlation between the real and imaginary components at the differential product calculator 208). Consequently, a larger estimation range for frequency offset may be achieved using embodiments of the inventive subject matter. The output of the differential product calculator 208 may be processed by subcorrelator integrator 210.

Figure 5:
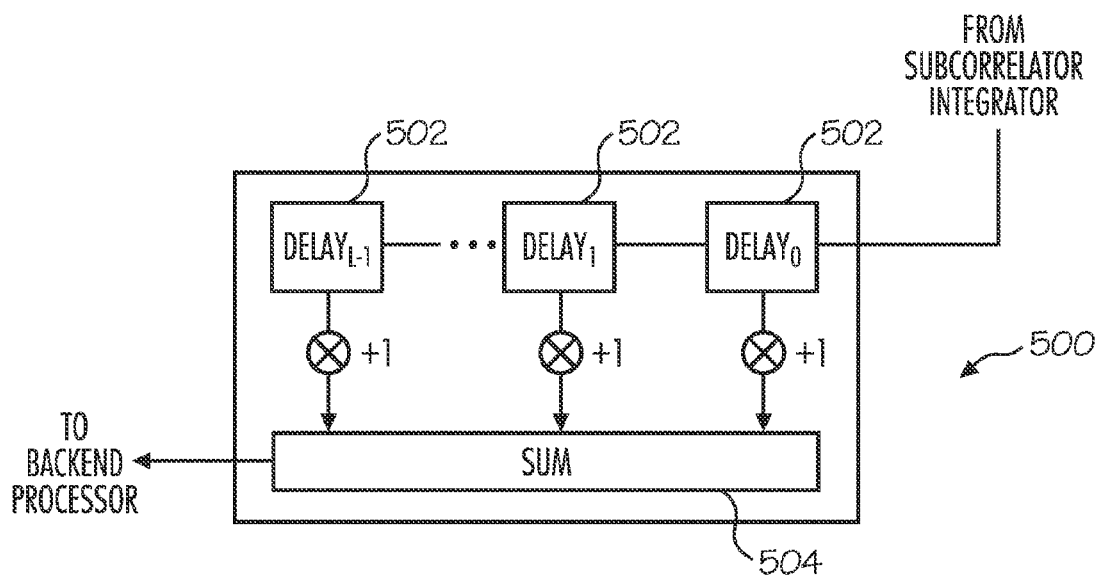
FIG. 5 illustrates a block diagram of a subcorrelator integrator in accordance with an example embodiment.

FIG. 5 illustrates a block diagram of a subcorrelator integrator 500 (e.g., subcorrelator integrator 210, FIG. 2), in accordance with an example embodiment. In an embodiment, subcorrelator integrator 500 includes a plurality of delays 502 (e.g., L−1 total delays, where L is the number of subcodes in a subcode series). In an embodiment, each delay may be set to N/2 samples (e.g., one per code length). Each of the delays may be added by a summer 504. The output of each delay may be multiplied by a unique word, $W=[w_0\ldots w_{L-1}]$, to provide a desired level of protection against false detection. In an embodiment $w_0\ldots w_{L-1=1}$. Summer 504 adds the output of the differential product calculator 208 to find an overall peak of the subcode sequence (e.g., subcode sequence 108, FIG. 1), or a correlation peak.

Figure 6:
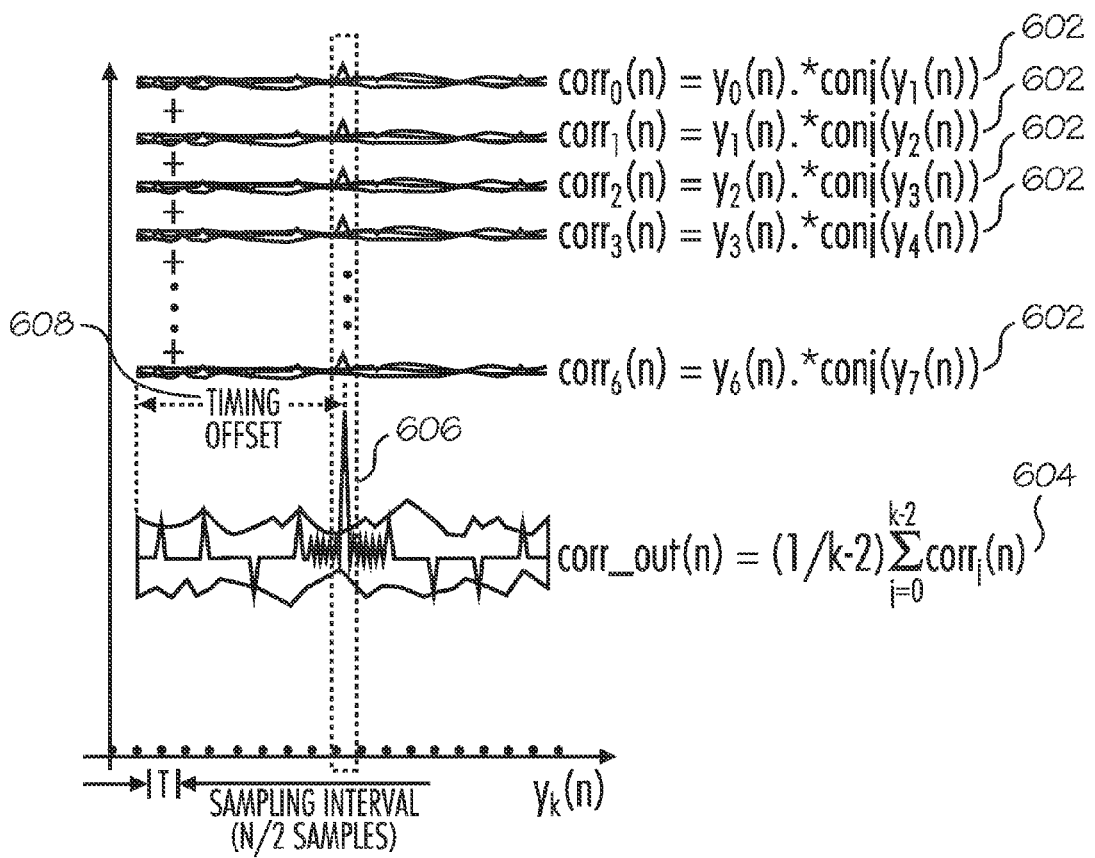
FIG. 6 is a diagram illustrating operation of a subcorrelator integrator in accordance with an example embodiment.

FIG. 6 is a diagram illustrating operation (e.g., a summation process) of a subcorrelator integrator (e.g., subcorrelator integrator 210, FIG. 2) in accordance with an example embodiment. A correlation graph 602 for each of the subcodes (e.g., subcodes 110, FIG. 1) is illustrated. The correlation graphs 602 may be summed together to form a summed result 604 having a correlation peak 606. The correlation peak 606 may be used to determine a timing offset 608 representing an offset between the detection peak, as located, and where the detection peak should be. Detection of the correlation peak 606 occurs when the correlation peak 606 exceeds a threshold as discussed further below. The threshold may be determined using a threshold detection technique that provides a given level of desired receiver detection characteristics (e.g., a technique that accounts for the probability of false detections with an associated level of missed detections). In various embodiments, correlation peak 606 may be detected without prior knowledge of timing, frequency, and/or phase offsets. This non-coherent detection of a possible acquisition of an acquisition sequence (e.g., a correlation peak) may then be verified in a coherent process, in an embodiment, as discussed below. The initial non-coherent detection of a correlation peak may allow for a low complexity method for determining an acquisition in a coherent fashion.

The detection of the correlation peak 606, when incorporating the differential product calculator (e.g., differential product calculator 208, FIG. 2), may lower a probability of missed detections for a given level of false detection performance over methods that do not use a differential product calculator. Also, a summation in a subcorrelator integrator (e.g., subcorrelator integrator 210) may enhance the correlation peak 606, which may make the peak value more easily detectable. Even when the peak for the correlation of each subcode (e.g., subcode 110, FIG. 1) falls below a noise level, the enhancement of the correlation peak may raise the correlation peak 606 above the noise level and allow for detection. Additionally, the phase of the output of a summer (e.g., summer 504, FIG. 5) or, equivalently the phase at the correlation peak 606, may be used to provide an estimate proportional to the frequency offset between a transmitter and a receiver (e.g., transmitter 203 and receiver 200, FIG. 2), as is discussed below. In an embodiment, the use of substantially the same (e.g., identical) subcodes may result in higher output peaks, which may provide a higher tolerance for frequency offsets.

Referring again to FIG. 2, backend processor 212 uses the output of the subcorrelator integrator 210 for further processing, such as coherent match filtering, processing to eliminate false detections, decoding of the payload of a received communication frame, tracking of frequency or phase changes and the like.

Figure 7:
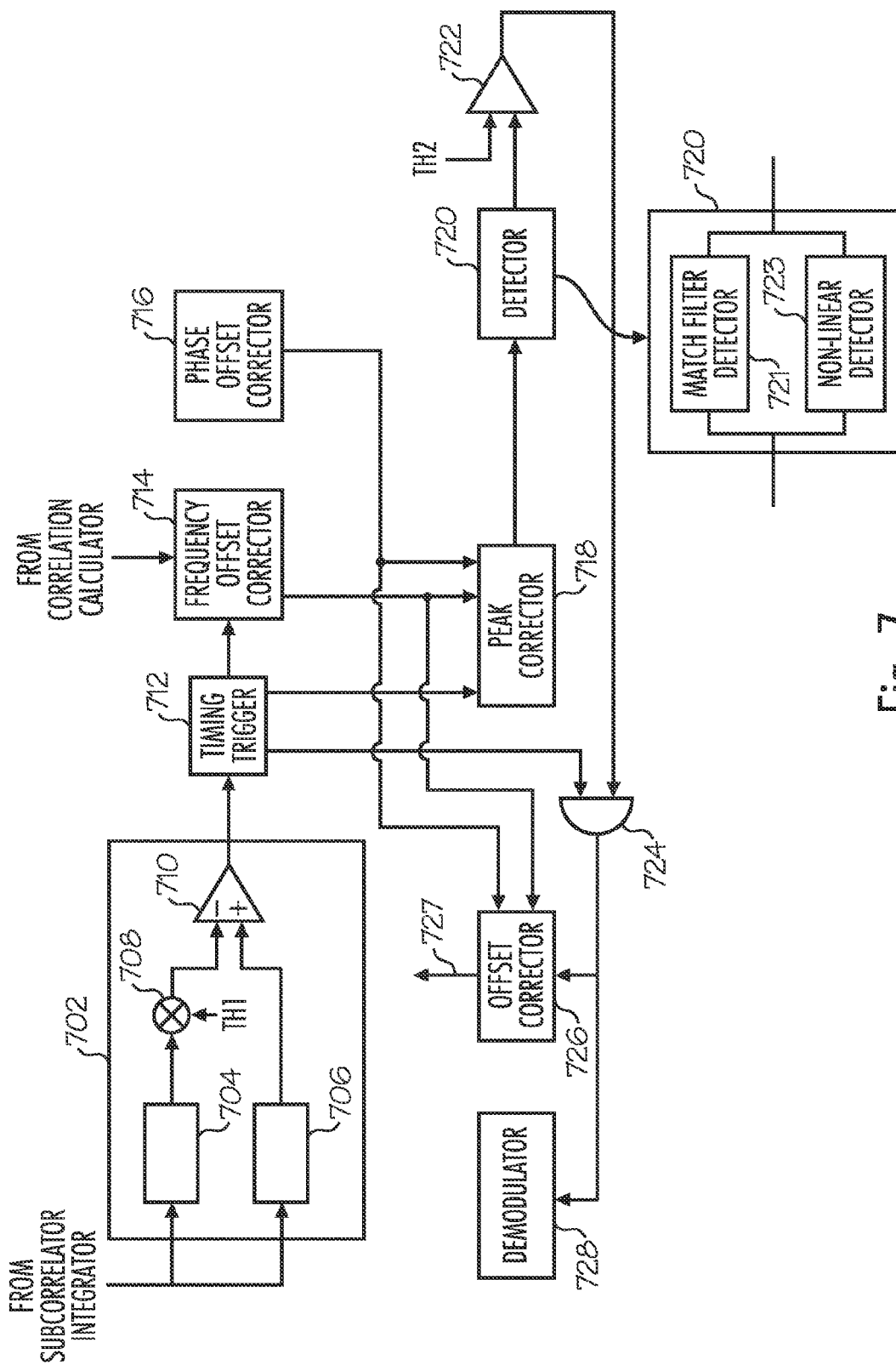
FIG. 7 illustrates a block diagram of a backend processor in accordance with an example embodiment.

FIG. 7 illustrates a block diagram of a backend processor 700 (e.g., backend processor 212, FIG. 2) in accordance with an example embodiment. Backend processor 700 includes a peak detector 702, a timing trigger 712, a frequency offset corrector 714, a phase offset corrector 716, a peak corrector 718, a coherent peak detector 720, a detection comparator 722, a selector 724, an offset corrector 726, and a demodulator 728, in an embodiment.

In an embodiment, peak detector 702 receives an output of a subcorrelator integrator (e.g., subcorrelator integrator 210, FIG. 2), and compares the magnitude of the output to a threshold (e.g., a threshold set above an average noise level) to determine if the output from the subcorrelator integrator is above the threshold. When the output is above the threshold, the system determines that a correlation peak has been detected, which may represent a preamble signal. In an embodiment, the detected correlation peak may be used to determine a timing offset. The detected correlation peak may also be used as a timing trigger to initiate further processing of received signals, in an embodiment. Peak detector 702 represents one exemplary embodiment to detect a correlation peak from an output of a subcorrelator integrator. Other peak detection apparatus may be used in other embodiments.

In an embodiment, peak detector 702 includes an averager 704, a magnitude calculator 706, a multiplier 708, and a comparator 710. Averager 704 and magnitude calculator 706 each may receive an output of the subcorrelator integrator (e.g., subcorrelator integrator 210, FIG. 2). An output of averager 704 may be received by a first input to comparator 710. The output of the magnitude calculator 706 provides a second input to the comparator 710. In an embodiment, the averager 704 is coupled to a threshold setter 708.

Averager 704 determines an average noise level of the output of the subcorrelator integrator, in an embodiment. The average noise level may be calculated, for example, by determining an average noise power. Multiplier 708 receives an output from averager 704, and multiplies the output by a threshold, $TH_1$. In an embodiment, the threshold, $TH_1$, has a value at a predetermined level above the average noise level. The threshold may be chosen to avoid false detection while minimizing the probability of a missed event.

Magnitude calculator 706 determines a magnitude of the output of the subcorrelator integrator. Comparator 710 compares the output of multiplier 708 with the output of magnitude calculator 706. When the output of magnitude calculator 706 exceeds the output of comparator 710, a determination may be made that a potential peak (e.g., peak 606, FIG. 6) has been detected. In an embodiment, peak detection initially may be done non-coherently, or without correcting for any time, frequency or phase offset (except any time-varying rotational phase eliminated by a differential product calculator (e.g., differential product calculator 208, FIG. 2).

Timing trigger 712 receives an output from peak detector 702 (e.g., information regarding a detected peak) and determines a timing offset (e.g., timing offset 608, FIG. 6). The timing offset, in turn, may be used to determine a frequency offset and a phase offset of the detected signal.

Timing trigger 712 outputs a timing offset, which is received by frequency offset corrector 714 and detection selector 724. In an embodiment, frequency offset corrector 714 also receives a plurality of correlation peaks output from a correlation calculator (e.g., correlation calculator 206, FIG. 2). In an embodiment, the peak determined for each subcode is received at the frequency offset corrector 714. Frequency offset corrector 714 determines a frequency offset from the plurality of detected peaks.

In an embodiment, a frequency offset may be determined by placing the peak detected for each subcode (e.g., subcodes 110, FIG. 1) at correlation calculator (e.g., correlation calculator 206, FIG. 2) in a common modulation state. In an embodiment, the subcodes may be in different modulation states based on the type of modulation scheme used. For example, if the subcodes use a 4-ary pulse-position modulation (PPM), each symbol may be in one of four modulation states. If the carrier frequency of a receiver (e.g., receiver 200, FIG. 2) is different from the frequency of a transmitter (e.g., transmitter 203, FIG. 2), the phase of the correlation peak may rotate over each baud time, (e.g., where each baud may be equivalent to a symbol for each subcode).

Figure 8:
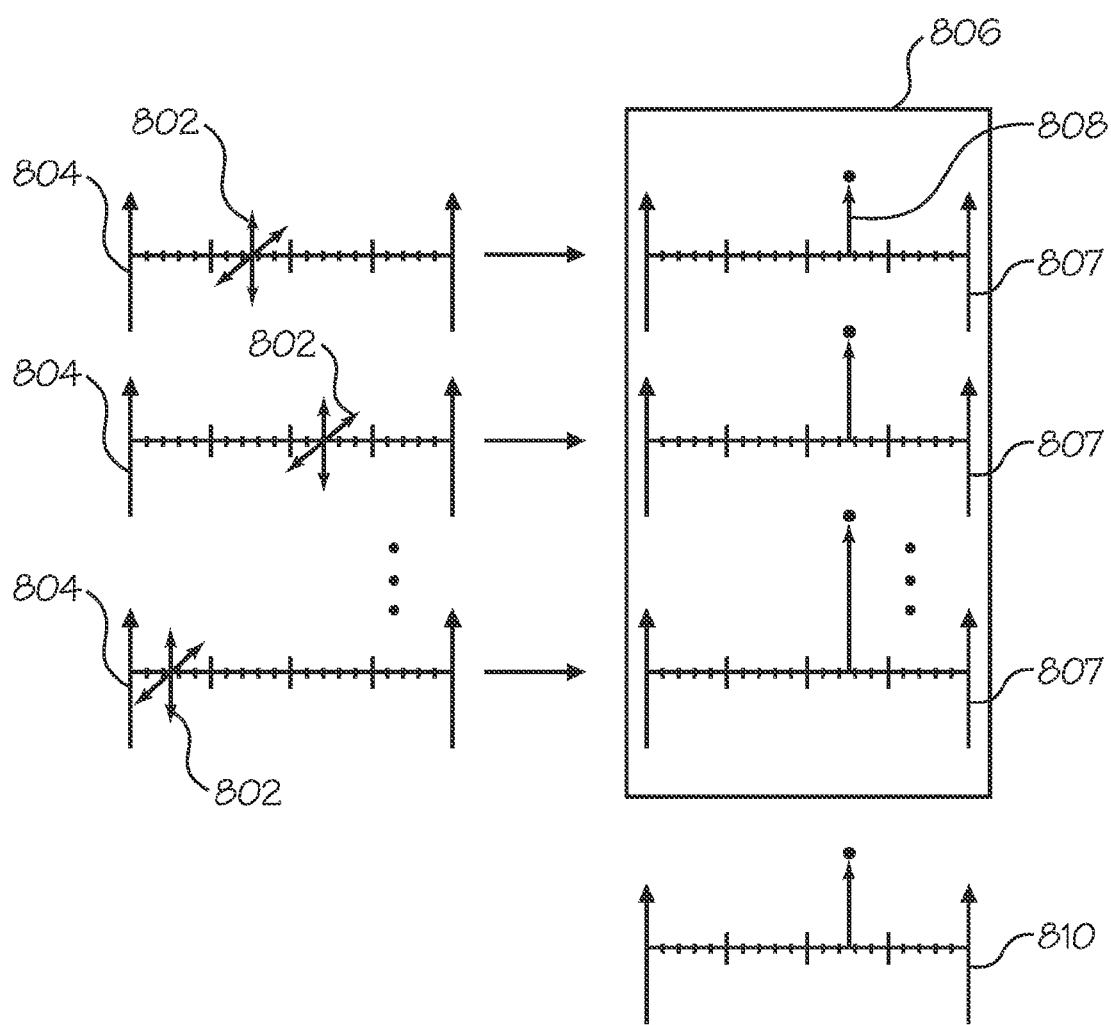
FIG. 8 illustrates a frequency detection process in accordance with an example embodiment.

FIG. 8 illustrates a frequency detection process in accordance with an example embodiment. Detected peaks 802 for multiple detected symbols 804 may be in different rotational states. In the illustrated example, each of the detected peaks 802 is rotated and adjusted to a common modulation state, resulting in corrected symbol vectors 808. The corrected symbol vectors 808 are placed in a phasor stack 806. In an embodiment, phasor stack 806 is formed with a phasor stack entry 807 corresponding to each detected symbol 804 (e.g., for each correlation peak). In other words, phasor stack 806 may include a corrected symbol vector 808 corresponding to each detected peak after it has been adjusted to a common modulation state. The time between each phasor stack entry 807 may be substantially equivalent to the time elapsed between the detection of each symbol, which may be known as the time between the detection of each baud, $\Delta T_{baud}$. A change in the magnitude of each corrected symbol vector 808 may represents a change in frequency, $\Delta \Phi$. As discussed previously, when the carrier frequency of a receiver (e.g., receiver 200, FIG. 2) differs from the frequency of the transmitter (e.g., transmitter 203, FIG. 2), the receiver frequency error is $\Delta \Phi / \Delta T_{baud}$, or a change in frequency divided by a timing offset (e.g., the time between the detection of each baud). To provide a more accurate estimate of the receiver frequency offset, each of the corrected symbol vectors 808 for the phasor stack entries 807 may be integrated into vector 810. Once a frequency offset, $\Delta \Phi / \Delta T_{baud}$ is determined, a known $\Delta T$ may be used to determine the $\Delta \Phi$, or the frequency offset. The frequency offset is represented by the change in frequency over the change in time.

Referring back to FIG. 7, frequency offset corrector 714 outputs a frequency offset, which may be received by phase offset corrector 716, peak corrector 718, and offset corrector 726. Phase offset corrector 716 determines the receiver carrier phase offset of the signal. The phase offset may be considered an offset remaining in the plurality of correlation peaks after correcting for the frequency offset.

Peak corrector 718 receives a timing offset, a frequency offset, and a phase offset from timing trigger 712, frequency offset corrector 714, and phase offset corrector 716, respectively. In addition, peak corrector 718 receives the plurality of correlation peaks produced by the correlation calculator (e.g., correlation calculator 206, FIG. 2). Peak corrector 718 uses this data to correct each of the convoluted peaks in frequency, phase, and time. Peak corrector 718 produces a result that includes a plurality of corrected correlation peaks, or a plurality of coherently-aligned peaks. The plurality of coherently aligned peaks may then be analyzed to verify if the correlation peak was properly detected using non-coherent determination techniques.

An output from peak corrector 718 is received by coherent peak detector 720, which may perform a coherent match filter process on the plurality of coherently-aligned peaks to determine if the peak detected at the output of the subcorrelator integrator represents an actual acquisition of the preamble. In an embodiment, coherent peak detector 720 may include a coherent match filter detector 721 and a non-linear detector 723. In an embodiment, coherent match filter detector 721 receives the plurality of coherently-aligned peaks from peak corrector 718 and averages them together. The average may be a moving average, in an embodiment. The match filter result may then be compared to a first threshold. When the match filter result falls below the first threshold, the peak determined at the subcorrelator integrator may be considered to be a false detection. When the match filter result exceeds the first threshold, a detection of the correlation peak is considered to be verified, and the results from the peak corrector 718 may be used in a non-linear detection method.

In an embodiment, non-linear detector 723 performs a non-linear process on the plurality of coherently-aligned peaks from peak corrector 718. In an embodiment, this includes multiplying the plurality of coherently-aligned peaks and determining if the non-linear process results are above or below a second threshold. When a result of a multiplication falls below the second threshold, the peak determined at the output of the subcorrelator integrator may be considered a false detection and may be rejected. When a result of the non-linear detector 723 exceeds the second threshold, then the peak detected at the output of the subcorrelator integrator may be considered to be properly detected, a detection of the correlation peak is considered to be verified, and the preamble may be considered to be properly acquired.

When the subcodes (e.g., subcodes 110, FIG. 1) are substantially the same (e.g., identical), checking the output of the peak corrector 718 using both a coherent match filter detector 721 and a non-linear detector 723 may provide a better determination of whether a preamble was properly acquired. One reason is that, while a coherent match filter detector 721 may determine a result that exceeds a first threshold due to a partial correlation with noise around the peak, performing a second check using a nonlinear process may help to eliminate false detections. In cases where the subcodes (e.g., subcodes 110, FIG. 1) are not substantially the same, there may only be a match at the coherent match filter detector 721 when all of the peaks coherently line up. In this case, non-linear detector 723 may not be used.

As discussed previously, coherent match filter detector 721 may average together the plurality of coherently-aligned peaks from the peak corrector 718. This may be done, in an embodiment, by summing all of the individual correlation peaks, and the result may be divided by the number of correlation peaks. In an example embodiment, as discussed previously, a total of eight subcodes may be used, which results in a total of eight correlation peaks. In this embodiment, only eight additions and one division may be performed to determine the coherent match filter value. Thus, the inventive subject matter may provide for a relatively low-complexity match filter detector.

The complexity of the match filter may be decreased further through the use of a moving average match filter, in an embodiment. To utilize a moving average match filter, it is first noted for a time index, k, an average of X may be represented according to Eqn. 3:

$$\bar{x}_k = \frac{1}{n} \sum_{i=k-n+1}^{k} x_i = \bar{x}_k - \bar{x}_{k-1}$$

$$= \frac{1}{n} \left[ \sum_{i=k-n+1}^{k} x_i - \sum_{i=k-n}^{k} x_i \right]$$

$$= \frac{1}{n} [\bar{x}_k - \bar{x}_{k-n}].$$

Eqn. 3

For time index k−1, the average of x may be represented according to Eqn. 4:

$$\bar{x}_{k-1} = \frac{1}{n} \sum_{i=k-n}^{k} x_i.$$

Eqn. 4

Combining Eqn. 3 and Eqn. 4 yields Eqn. 5:

$$\bar{x}_k = \bar{x}_{k-1} + \frac{1}{n} [x_k - x_{k-n}].$$

Eqn. 5

Therefore, to compute a new average when new data is received, the oldest term may be subtracted from the newest term, and the result may be divided by the number of data points. The result may then be added to the old average. This allows for the computation of an average without having to add all data and divide by the number of data points each time a new average is added. A weighted moving average also may be used.

Referring again to FIG. 7, an output of detector 720 is received by detection comparator 722, which also receives a threshold value, $TH_2$. Detection comparator 722 determines whether the output of detector 720 exceeds the threshold, $TH_2$. When it does, then the detected peak is considered to be a verified detection peak.

Selector 724 receives an output from detection comparator 722 and timing trigger 712. In an embodiment, selector 724 includes an AND gate. When both the timing trigger 712 and the output of the detector 720 are triggered, selector 724 allows for the operation of offset corrector 726 and demodulator 728. This indicates that an acquisition of the acquisition code symbol sequence has occurred.

Offset corrector 726 receives outputs from frequency offset corrector 714, phase offset corrector 716, and selector 724, and uses this information to adjust a carrier frequency of the receiver (e.g., receiver 200, FIG. 2) via an output signal 727. In an embodiment, front end components of the receiver may include a numerically controlled oscillator (NCO), which may be controlled to adjust the carrier frequency of the receiver. In an embodiment, the frequency offset determined from the frequency offset corrector 714 may be used to adjust the NCO. Thus, if the carrier frequency of the receiver drifts, the change may be detected by the frequency offset corrector 714, and the carrier frequency adjusted by the offset corrector 726 using a control signal 727 to the NCO. This provides a convenient method for tracking signals with changing frequency.

In an embodiment, once it is determined that the preamble has been detected, the payload following the preamble may be demodulated. Demodulator 728 receives an output from selector 724, and demodulates the payload. Demodulator 728 may include any of a number of different types of demodulators, including but not limited to an orthogonal frequency division multiplexing (OFDM) demodulator. An OFDM demodulator may provide more accurate frequency synchronization using the pilot subcarriers or decision feedback methods.

Embodiments of the inventive subject matter may provide at least one economic and/or technical advantage over prior systems. In particular, an advantage to embodiments may be a significant reduction in computational complexity for calculating a matched filter correlation. This reduction may be achieved, in various embodiments, by code splitting, or splitting a longer, more memory and processor intensive code, into multiple smaller ones that are easier to process and manage in memory. In addition or alternately, this reduction may be achieved, in various embodiments, by using substantially the same code for each sub-code, which also may reduce processing complexity and memory use.

While various embodiments have been presented in the foregoing detailed description, it should be appreciated that a vast number of variations exist. It should also be appreciated that the illustrated and described embodiments are only examples, and are not intended to limit the scope, applicability, or configuration of the inventive subject matter in any way. Rather, the foregoing detailed description provides those skilled in the art with a convenient road map for implementing an embodiment of the inventive subject matter, it being understood that various changes may be made in the function and arrangement of elements described herein without departing from the scope of the inventive subject matter as set forth in the appended claims.

The invention claimed is:

1. An apparatus to receive a communication frame, the apparatus comprising:
an antenna configured to receive the communication frame, wherein the communication frame includes an acquisition code symbol sequence, and wherein the acquisition code symbol sequence includes a plurality of acquisition code symbols, and wherein at least one of the acquisition symbols includes a subcode sequence with a plurality of subcodes, wherein each subcode of the plurality of subcodes is identical; and
a correlation calculator configured to calculate a matched filter correlation between the plurality of subcodes of the communication frame and a stored version of the plurality of subcodes, resulting in a correlation calculator output, wherein the correlation calculator is also configured to determine a timing offset for further processing of the communication frame.

2. The apparatus of clam 1, wherein a phase of the correlation calculator output provides an estimate of a frequency offset between a transmitter that transmitted the communication frame and the receiver.

3. The apparatus of claim 1, further comprising:
a differentiator configured to determine a version of the correlation calculator output that is free from a time-varying phase rotation.

4. The apparatus of claim 1, further comprising:
a subcorrelator configured to sum the correlation calculator output for each subcode of the plurality of subcodes, and to determine an overall correlation of the subcode sequence.

5. The apparatus of claim 1, wherein the correlation calculator comprises:
a first fast Fourier transform calculator configured to convert the stored version of the plurality of subcodes into a first frequency domain reference signal;
a second fast Fourier transform calculator configured to convert the plurality of subcodes into a second frequency domain reference signal;
a multiplier coupling the first fast Fourier transform calculator and the second fast Fourier transform calculator, wherein the multiplier is configured to multiply the first frequency domain reference signal and the second frequency domain reference signal to produce a multiplier output; and
an inverse fast Fourier transform calculator configured to determine a time domain correlation for the multiplier output.

6. The apparatus of claim 5, wherein an overlap and save process is used to calculate the time domain correlation.

7. The apparatus of claim 5, wherein an overlap and add process is used to calculate the time domain correlation.

8. The apparatus of claim 5, wherein the correlation calculator further comprises:
a buffer coupled to the second fast Fourier transform calculator, wherein the buffer is to store the acquisition code symbol sequence with a one-subcode delayed version of the acquisition code symbol sequence, and wherein the buffer includes a plurality of rows, wherein a first row includes the acquisition code symbol sequence, and a second row includes the delayed version of the acquisition code symbol sequence.

9. A method for acquiring an acquisition code symbol sequence transmitted in a communication frame, the method comprising:
receiving the acquisition code symbol sequence, wherein the acquisition code symbol sequence includes a plurality of acquisition code symbols, and wherein an acquisition code symbol includes a subcode sequence having a plurality of subcodes, wherein each subcode of the plurality of subcodes is identical; and
calculating a correlation between the plurality of subcodes and a stored version of the plurality of subcodes, to produce a correlation calculator output.

10. The method of claim 9, further comprising:
generating a version of the correlation calculator output that is free of a time-varying phase rotation.

11. The method of claim 9, wherein calculating the correlation comprises:
summing a subcode correlation for each subcode of the plurality of subcodes to determine the correlation for the subcode sequence.

12. The method of claim 11, wherein calculating the correlation comprises:
converting the stored version into a frequency domain reference using a first fast Fourier transform;
converting the plurality of subcodes into a frequency domain acquisition sequence using a second fast Fourier transform;
multiplying the frequency domain reference and the frequency domain acquisition sequence, to produce a multiplier output; and
inverting the multiplier output using an inverse fast Fourier transform calculator to calculate the correlation.

13. The method of claim 12, further comprising:
storing the plurality of subcodes and a one-subcode delayed version of subcodes to a buffer that includes a plurality of columns, wherein a first entry in a column includes a subcode of the acquisition sequence and a second entry in the column includes a delayed version of the subcode.

14. The method of claim 9, wherein calculating the correlation further comprises:
using an overlap and save method to calculate the correlation.

15. The method of claim 9, wherein calculating the correlation further comprises:
using an overlap and add method to calculate the correlation.

16. The method of claim 9, further comprising:
determining a frequency offset between a transmitter that transmitted the acquisition sequence and a receiver that received the acquisition sequence using a phase of a peak of the correlation.

17. A method for acquiring an acquisition code symbol sequence transmitted in a communication frame, the method comprising:
receiving the acquisition code symbol sequence, wherein the acquisition code symbol sequence includes a plurality of acquisition code symbols, and wherein an acquisition code symbol includes a subcode sequence;
splitting the acquisition code symbol sequence into a plurality of subcodes, wherein each subcode of the plurality of subcodes is identical; and
calculating a matched filter correlation between the plurality of subcodes and a stored version of the plurality of subcodes.

* * * * *